(12) United States Patent
Fujimoto et al.

(10) Patent No.: US 6,238,152 B1
(45) Date of Patent: May 29, 2001

(54) TOOL CLAMPING MECHANISM AND PULL STUD

(75) Inventors: Akihiko Fujimoto; Kunio Kojima; Shinya Okamoto; Naoki Sato, all of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/513,172

(22) Filed: Feb. 25, 2000

(30) Foreign Application Priority Data

Apr. 13, 1999 (JP) .................................................. 11-105140

(51) Int. Cl.[7] ................................ B23Q 3/12; B23C 9/00
(52) U.S. Cl. ......................................... 409/233; 408/239 A
(58) Field of Search ..................................... 409/233, 231, 409/234, 232; 82/161, 160; 402/239 R, 238, 239 A; 279/75, 82

(56) References Cited

U.S. PATENT DOCUMENTS

| | | | | |
|---|---|---|---|---|
| 3,975,984 | * | 8/1976 | Simmons | 409/233 |
| 4,290,720 | * | 9/1981 | Ferreira | 409/233 |
| 4,334,811 | * | 6/1982 | Trumpf | 409/233 |
| 4,548,532 | * | 10/1985 | Watanabe | 409/233 |
| 4,604,012 | * | 8/1986 | Kawasaki | 409/233 |
| 4,668,137 | * | 5/1987 | Iwakura | 409/233 |
| 4,692,074 | * | 9/1987 | Smith | 409/233 |
| 5,052,866 | * | 10/1991 | Bauch | 409/233 |
| 5,730,562 | * | 3/1998 | Matsumoto et al. | 409/233 |
| 5,860,776 | * | 1/1999 | Sato et al. | 409/233 |

\* cited by examiner

*Primary Examiner*—William Briggs
(74) *Attorney, Agent, or Firm*—Staas & Halsey LLP

(57) ABSTRACT

A fixed first sleeve and a movable second sleeve are arranged in a center through hole of a main spindle. Balls at the rear end of the second sleeve engage a recessed slope of the first sleeve and a recessed slope of a draw bar, thereby amplifying the urging force of a spring for urging the draw bar upward. Balls at the distal end of the second sleeve hold and pull in the head of the pull stud with the amplified force. The pull stud has an axial through hole and a hole that connects with the through hole and opens sideways. Compressed air passes through these holes, thereby cleaning the respective taper surfaces and end faces of the main spindle and a tool shank. Switching means is used to close the hole that opens sideways, whereby a cutting fluid is allowed to flow through the axial through hole only.

6 Claims, 9 Drawing Sheets

FIG. 4A
FIG. 4B
FIG. 4C
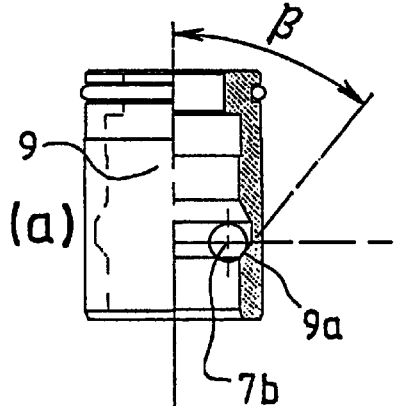
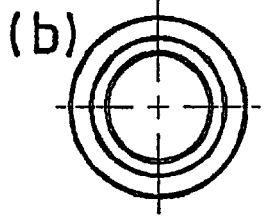
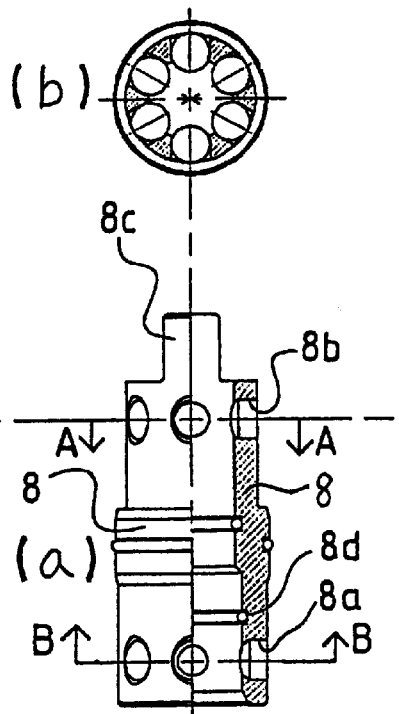
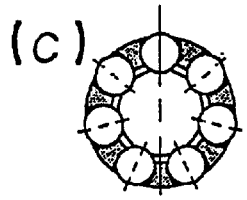
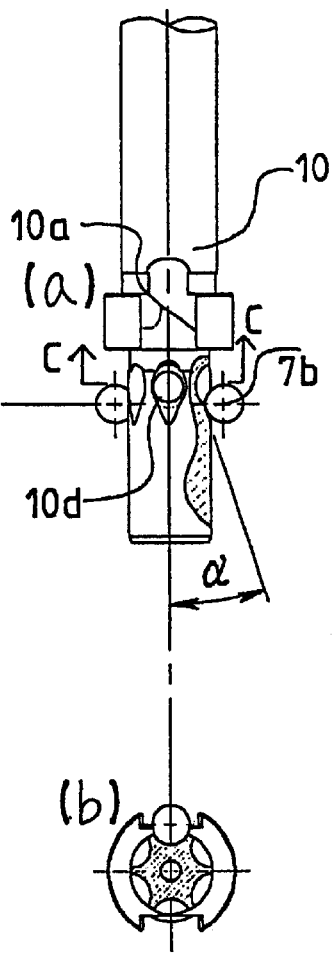

TOOL CLAMPING MECHANISM AND PULL STUD

BACKGROUND OF THE INVENTION

1. Field of the Invention

The present invention relates to a main spindle structure of a machine tool, and more specifically, to a tool clamping mechanism of the ball-chuck type with high tool retaining stiffness, and a pull stud used for the tool clamping mechanism.

2. Description of the Prior Art

FIG. 7 is a view showing a main spindle structure that uses a conventional tool clamping mechanism of the ball-chuck type.

A housing 2 is fixed to the distal end of a spindle head 1, and a main spindle 4 is rotatably held by means of a bearing 3 in the housing 2. A draw bar 10 is disposed in a through hole that extends along the axis of the main spindle 4. Balls 7a are embedded in the distal end of the draw bar 10, thus forming a ball chuck portion for holding a pull stud 13 that is attached to a tool shank 5. The pull stud 13 is held by means of the ball chuck portion and pulled into the main spindle 4.

A spring 11 is provided coaxially surrounding the draw bar 10. The draw bar 10 is moved upward as in FIG. 7 by means of the repulsive force of the spring 11, and the pull stud 13 held by means of the ball chuck portion is pulled into the through hole in the main spindle 4.

As a roller 12 advances, the draw bar 10 that is coupled to a guide ring 10b is pushed downward as in FIG. 7. As the draw bar 10 descends, a spread portion of the through hole in the main spindle 4 causes the ball chuck portion of the draw bar 10 to open, thereby allowing the pull stud 13 to be stored. When the pull stud 13 of the tool is inserted into the main spindle 4 through its distal end, the ball chuck portion of the draw bar 10 holds the stud 13.

As the roller 12 retreats, the draw bar 10 is moved upward as in FIG. 7 and pulled in by means of the repulsive force of the spring 11, and the ball chuck portion securely holds the pull stud 13 by means of a contracted portion of the through hole.

When the pull stud 13 is pulled into the through hole of the main spindle 4 by means of the draw bar 10, a taper surface 5a of the tool shank 5 and a taper surface on the inner peripheral surface of the distal end of the spindle 4 are brought intimately into contact with each other. Thereupon, the tool is held integrally with the spindle 4 and clamped.

In general, a disk spring or coil spring is used as the spring 11. The example shown in FIG. 7 is a double coil spring that can generate a clamping force of about 270 kgf. This clamping force is a proper force for the size of the tool shank of the taper-crank type.

The coil spring, compared to the disk spring, is subject to less frictional hysteresis, so that it produces a stable load. Since it smoothly touches the draw bar 10, moreover, the coil spring cannot easily mar the draw bar 10. If it is designed with a stress amplitude not higher than a given value, furthermore, it can repeat the generation of its load substantially permanently, thus enjoying good durability.

As mentioned before, on the other hand, the clamping force is generated by the intimate contact between the taper portions. In order to enhance the tool retaining stiffness, therefore, cuttings or other foreign matter must be kept away from the taper surfaces.

The taper portions can be cleaned by taper cleaning such that foreign matter is discharged to the outside by means of a large quantity of compressed air that is delivered from a center through hole 10c of the draw bar 10 and flows between the taper portions when the taper surface 5a of the tool shank 5 is caused slightly to leave the taper portion of the main spindle 4 by tool changing operation. In attaching a new tool shank to the main spindle 4, their taper portions are subjected to the taper cleaning with compressed air so that they come intimately into contact with each other.

A cutting fluid for cooling and lubricating the cutting edge of a tool can be delivered to the tool through the center through hole 10c of the draw bar 10 and a center through hole in the pull stud 13.

As the productivity of modern machine tools is improved, the tool retaining force is expected to be increased by enhancing the fixation of the tool or tool holder to the spindle shaft, in order to ensure higher cutting performance. To attain this, two-side-restricted tool shanks have started to be generally used (See Japanese Patent Application Laid-Open No. 10-58260).

This two-side-restricted tool shank is designed so that both a taper portion and a cylindrical end face of an arbor are brought intimately into contact with a main spindle. Basically, the tool retaining stiffness of the tool shank of this type can be made higher than that of a tool shank that is designed for intimate contact between taper portions only.

The two-side-restricted tool shank requires cleaning of the contact portions between the respective end faces of the main spindle and the tool shank. If cuttings and the like adhere to the end contact portions, the tool shank is inevitably inclined when it is attached to the main spindle, so that the machining accuracy is lowered. Accordingly, it is necessary to provide means for supplying plenty of compressed air to the end contact portions to blow off the cuttings and other foreign matter, as well as the taper cleaning.

Recently, center-through cooling has been generalized such that cutting oil is supplied from the center of the main spindle to the tool end. In order to feed the cutting oil to the tool end under sufficient pressure according to this method, however, it is necessary to seal the tool shank and the clamping mechanism and provide only the tool end with a fluid channel. This requirement is not compatible with the requirement of the end face cleaning that involves the necessity to deliver air to the taper portions. In general, therefore, an expensive clamping mechanism is needed to reconcile the requirements of the center-through cooling and the end face cleaning.

In order to enhance the tool retaining stiffness for the main spindle, the adhesion between the respective contact surfaces of the main spindle and the tool shank should be enhanced, in ether case of ad hession between only taper portions or case of restriction by two-side ad hesion between a taper portion and end face. To attain this, the tool pulling force must be increased. The tool pulling force of a collet-type clamping mechanism is greater than that of a clamping mechanism of the ball-chuck type.

FIGS. 8A to 8C and FIGS. 9A to 9C show a main spindle structure designed and studied in the process of development of the present invention using the collet-type clamping mechanism. The same reference numerals are used for elements and components which are identical with those in the clamping mechanism of the ball-chuck type shown in FIG. 7.

In this collet-type clamping mechanism, the repulsive force of a spring 11 that acts on a draw bar 10 in a through hole in a main spindle 4 is transmitted to a pull stud 13 after it is amplified by means of a collet 16. FIG. 8A shows a state in which the draw bar 10 is withdrawn in the main spindle. In this state, as shown in FIG. 8C, the collet 16 is closed so that it can clamp the pull stud 13. When the draw bar 10 is pushed downward as in FIG. 8A, resisting the repulsive force of the spring 11, on the other hand, the collet 16 is opened so that it can receive pull stud 13.

A plunger 14, which is incorporated in the draw bar 10, is urged in the upward direction of FIG. 8A by means of a spring 15 in the draw bar 10. When the draw bar 10 is pushed down, as shown in FIG. 9A, the distal end of the collet 16 opens, as shown in FIG. 8B, so that the passage of the pull stud 13 is allowed. When the draw bar 10 is caused to ascend by the repulsive force of the spring 11, as shown in FIG. 9B, on the other hand, the distal end of the collet 16 is closed, as shown in FIG. 8C, and then holds and pulls up the pull stud 13.

In replacing the tool, compressed air is delivered from a through hole 10a in the center of the draw bar 10 and passes through a through hole 14a in the center of the plunger 14 that is urged upward by means of the spring 15. Then, the compressed air is injected into a space in which the collet 16 and the pull stud 13 are to be coupled to each other, and flows between the taper surface 5a of the tool shank 5 and the taper surface of the main spindle, thereby cleaning the taper surfaces. Further, the compressed air passes through a coupling hole 4a in the main spindle, which connects the distal end face of the spindle and the coupling space for the collet 16 and the pull stud 13. Then, the compressed air is jetted out between the respective end faces of the tool shank 5 and the main spindle to be brought intimately into contact with each other, thereby cleaning these end faces.

The repulsive force of the spring 15 is set so that the force of the spring 15 to push up the plunger 14 is greater than the force of the compressed air to push down the plunger 14 during the introduction of the compressed air. Therefore, the plunger 14 is kept upwardly open, as shown in FIG. 9A.

When the clamping is completed with the draw bar 10 raised, as shown in FIG. 9B, the introduction of the compressed air is stopped. When the cutting fluid is introduced through the through hole 10a in the center of the draw bar 10 to carry out machining, its pressure pushes down the plunger 14, resisting the urging force of the spring 15. Thereupon, the plunger 14 is pressed against the distal end of the pull stud 13, so that the through hole 14a in the plunger 14 and the through hole in the pull stud 13 are connected and closed, as shown in FIG. 9C. In consequence, the cutting fluid passes through the through hole 10a in the draw bar 10, through hole 14a in the plunger 14, and the through hole in the pull stud 13, and finally, is jetted out from the distal end of the cutting edge of the tool.

In the main spindle structure of the conventional tool clamping mechanism of the ball-chuck type shown in FIG. 7, the clamping force (pulling force) has the maximum value that can be attained in the actual space even with use of the double coil spring. In order to obtain a greater clamping force, it is necessary to increase the spring coil diameter and enlarge the rear part of the shaft of the main spindle. If a rotating part that has nothing to do with the main spindle stiffness is thickened, the inertia increases, and the acceleration performance of the main spindle worsens. In component machining that entails frequent acceleration and deceleration of the main spindle, therefore, the productivity of the machine may be lowered inevitably. To avoid this, it is necessary to restrict the diameter of the clamping mechanism not larger than the existing value.

With use of the collet-type clamping mechanism with the force amplifying means of FIGS. 8A, 9A, 9B and 9C that is designed to enhance the clamping force (pulling force), it is impossible to restrict the diameter of the main spindle not larger than the existing value, although a designed clamping force is expected to be attained. Supposedly, moreover, the rate of frictional force is so high that the clamping force cannot be stable at the contact portions of the components.

According to the clamping mechanism using a collet chuck, furthermore, the plunger or the like must be provided in the draw bar, as mentioned before, in order to reconcile the center-through cooling and the compressed-air cleaning of the respective contact surfaces of the main spindle and the tool shank. Inevitably, therefore, the resulting structure is complicated and expensive.

The plunger in the central portion of the collet chuck is brought into contact with the distal end of the pull stud under the pressure from the high-pressure cutting fluid. At the start of discharge of the cutting fluid, therefore, the plunger is caused to run against the distal end of the pull stud by a water hammer impact. Thus, there is a little chance for the plunger to fulfill its function steadily for a long period.

It is advisable, moreover, to avoid providing undurable components in those regions in the main spindle which are not accessible to maintenance operation.

For these reasons, the collet-type clamping mechanism is not a favorable mechanism for reconciling the center-through cooling and the compressed-air cleaning of the respective contact surfaces of the main spindle and the tool shank.

OBJECT AND SUMMARY OF THE INVENTION

The object of the present invention is to provide a compact clamping mechanism of the ball-chuck type enjoying a great clamping force.

A tool clamping mechanism according to the present invention is a clamping mechanism of the ball-chuck type, in which a draw bar is moved with respect to a main spindle in the axial direction thereof, whereby a ball chuck portion is moved to pull in or release a tool or tool holder. The draw bar has, in its outer peripheral portion, a first recess in a shape such that a rolling element can submerge therein. The tool clamping mechanism comprises a first sleeve, a second sleeve, and the rolling element. The first sleeve is formed having, in its inner peripheral surface, a second recess in a shape such that the rolling element can submerge therein, and is fixed to the inner peripheral surface of the main spindle between the draw bar and the ball chuck portion. The second sleeve is located between the first sleeve and the draw bar for movement in the axial direction with respect to the first sleeve and the draw bar. The second sleeve is formed having a hole penetrating the main spindle in the radial direction thereof. Further, the rolling element is stored in the through hole of the second sleeve. The first recess in the outer peripheral portion of the draw bar and the second recess in the inner peripheral portion of the first sleeve constitute a pulling force amplifying mechanism for amplifying a force along the axial direction of the draw bar, thereby amplifying a pulling force to be transmitted to the ball chuck portion.

According to the tool clamping mechanism constructed in this manner, center-through cooling and contact surface cleaning can be reconciled with each other.

The tool clamping mechanism according to the invention can increase its clamping force by means of the force amplifying mechanism that is attached to the ball chuck portion. Since the size of the main spindle structure is not increased, moreover, the resulting clamping mechanism is compact. Further, the general construction of the clamping mechanism is very simple because the inner periphery of the movable second sleeve and the outer periphery of the pull stud are sealed.

In case where the pull stud is provided with a guide hole for guiding compressed air, the respective taper surfaces and end faces of the main spindle and the tool shank to be brought intimately into contact with one another can be cleaned with the compressed air. If fluid channel switching means is provided in the guide hole of the pull stud, moreover, the fluid channel can be switched between a passage for a cutting fluid for center-through cooling and a passage for compressed air for cleaning, so that the center-through cooling can be reconciled with the cleaning of the respective contact surfaces of the main spindle and the tool shank.

Since the fluid channel switching means is provided in the pull stud, furthermore, the clamping mechanism can enjoy simplicity and high reliability. In case where the fluid channel switching means is located in the pull stud, as compared with the case where it is located in the draw bar, in particular, the frequency of its use is so low that its durability hardly involves any problem. If the fluid channel switching means in the pull stud gets out of order, moreover, the trouble can be eliminated by only changing the switch means or the whole pull stud.

BRIEF DESCRIPTION OF THE DRAWINGS

The foregoing and other objects and features of the invention will become apparent from the following description of preferred embodiments of the invention with reference to the accompanying drawings, in which:

FIGS. 4A to 4C are exploded perspective views showing principal components of the tool clamping mechanism of FIG. 1, in which FIG. 4A(*a*) is a partial sectional view of a first sleeve, FIG. 4A(*b*) is a bottom view of the first sleeve, FIG. 4B(*a*) is a partial sectional view of a second sleeve, FIG. 4B(*b*) is a sectional view taken along line A—A of FIG. 4B(*a*), FIG. 4B(*c*) is a sectional view taken along line B—B of FIG. 4B(*a*), FIG. 4C(*a*) is a side view, partially in section, showing the lower part of a draw bar, and FIG. 4C(*b*) is a sectional view taken along line C—C of FIG. 4C(*a*);

FIGS. 6A to 6C are views for illustrating pull studs of the tool clamping mechanism of FIG. 1, in which FIGS. 6A and 6B show a pull stud used for center-through cooling, and FIG. 6C shows a pull stud for cleaning without center-through cooling;

DETAILED DESCRIPTION OF THE PREFERRED EMBODIMENTS

Figure 1:
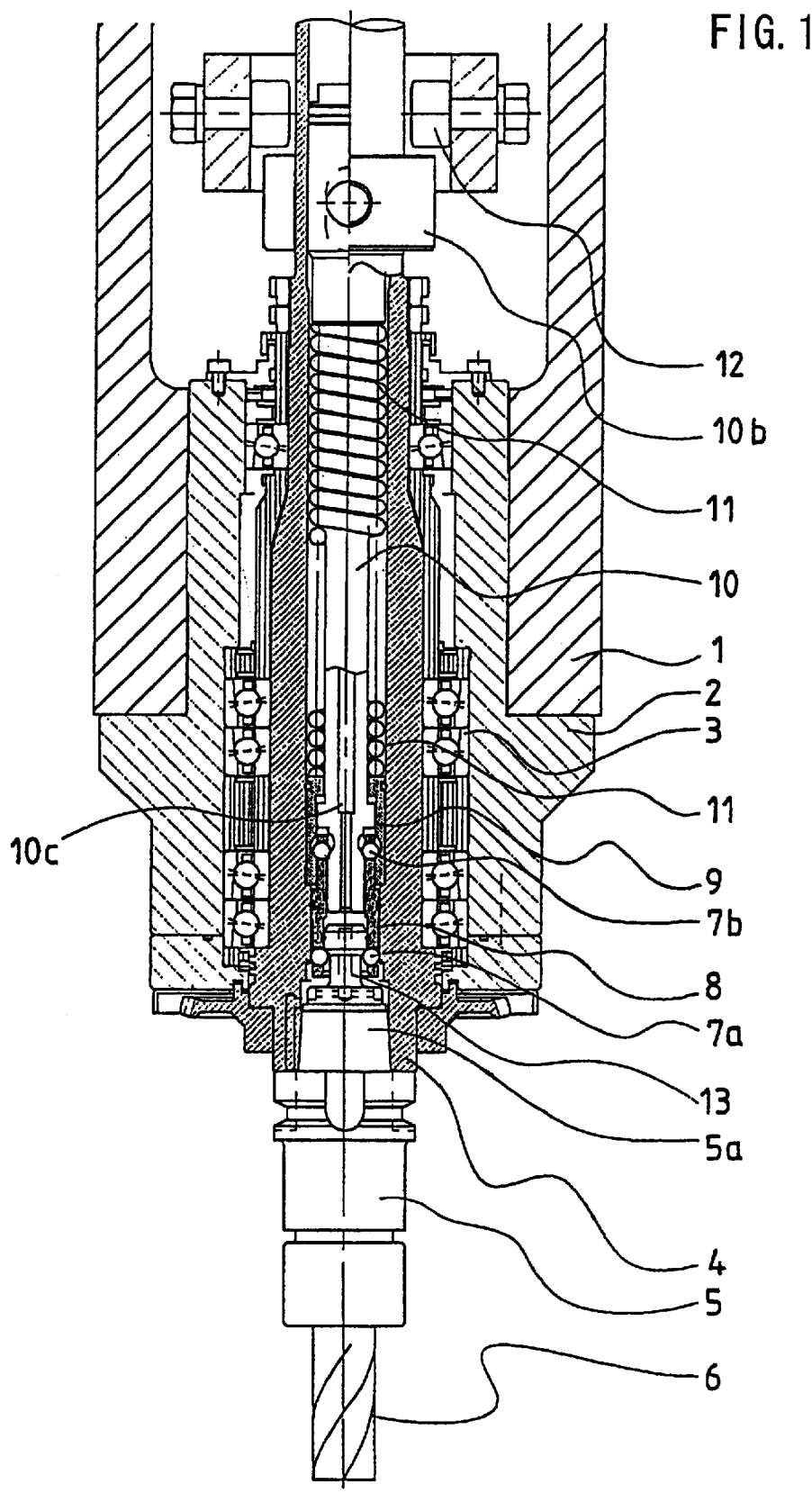
FIG. 1 is a sectional view of the principal part of a tool clamping mechanism according to one embodiment of the invention.

A tool clamping mechanism according to one embodiment of the present invention will now be described with reference to the accompanying drawings of FIGS. 1 to 6C. In these drawings, the same reference numerals are used for elements and components which are identical with those of the conventional clamping mechanism of the ball-chuck type shown in FIG. 7.

A main spindle 4 is rotatably supported by means of a bearing 3 in a housing 2 that is attached to a spindle head 1. A clamping mechanism for clamping a pull stud 13, a draw bar 10, etc. are arranged in a hole that is formed in the main spindle 4 so as to extend along its axis.

The clamping mechanism according to the present invention is composed of a first sleeve 9 fixed to the inner peripheral portion of the hole in the main spindle and a second sleeve 8 movable in the axial direction of the main spindle. One end of a spring 11 for urging the draw bar 10 upward abuts against the upper end face of the first sleeve 9. The draw bar 10 penetrates the spring 11. A through hole 10*c* is formed in the draw bar 10 so as to extend along its axis.

As shown in FIG. 4A, the first sleeve 9 is provided with a groove 9*a* that has a slope on its inner peripheral surface. The first sleeve 9 is fitted in the hole in the center of the main spindle 4 and fixed to the spindle hole by means of a contracted end portion of the hole and the spring 11. The recess or groove 9*a* that constitutes the slope on the inner peripheral surface of the first sleeve 9 may be given a cubic shape such that it can embrace balls 7*b*. Since the first sleeve 9 is small-sized, however, the degree of freedom of selection of its material and heat treatment is so high that a standby state can be secured without giving the cubic shape to the groove 9*a*. Thus, the groove 9*a* is shaped by turning only.

As shown in FIGS. 4B(*a*), 4B(*b*) and 4B(*c*), the upper part of the second sleeve 8, which is contracted or reduced in diameter, is inserted in the first sleeve 9. The contracted upper end portion of the second sleeve 8 can abut against a spread portion of the draw bar 10. A plurality of holes 8*a* and 8*b* radially penetrate the lower and upper parts of the second sleeve 8. Balls 7*a* and 7*b* are embedded in the holes 8*a* and 8*b*, respectively.

The balls 7*b* that are embedded in the upper holes 8*b* are adapted to engage the slope of the groove 9*a* in the first sleeve 9 and slopes of recesses 10*d* (mentioned later) in the draw bar 10. Further, the balls 7*a* that are embedded in the lower holes 8*a* constitute a ball chuck portion for holding the pull stud 13. Although the balls 7*a* are used as typical examples of rolling elements according to this embodiment, they may be replaced with rollers.

As shown in FIGS. 4C(*a*) and 4C(*b*), the recesses 10*d* are formed in the lower end portion of the draw bar 10, and their respective slopes engage the balls 7*b*, individually. Further, a spread portion to engage the upper end of the second sleeve 8 is located just above the recesses 10*d*. The spread portion is provided with a pair of grooves 10*a* that can engage a lug 8*c* on the second sleeve 8. A slope of each recess 10*d* of the draw bar 10 can be formed by means of a ball end mill that has a diameter a little greater than that of each ball 7*b* that engages the slope. Thus, a contact surface pressure that acts on the draw bar 10 is lowered to ensure satisfactory durability.

A tool shank 5, which can be fitted with various tools, is removed from the main spindle 4 by means of an automatic tool changer (not shown), and another tool shank is attached alternatively to the main spindle 4. A principal function of the clamping mechanism of the invention is to unclamp the tool shank 5 and clamp another tool shank, selected by means of the tool changer, in the main spindle during automatic changing operation. This clamping mechanism may be used to hold a pull stud of a tool holder and change the tool holder instead of changing the tool itself.

The tool changing (tool holder changing) operation according to this embodiment will now be described with reference to the drawings of FIGS. 2A, 2B, 3A, 3B and 3C.

Figures 2A, 2B:
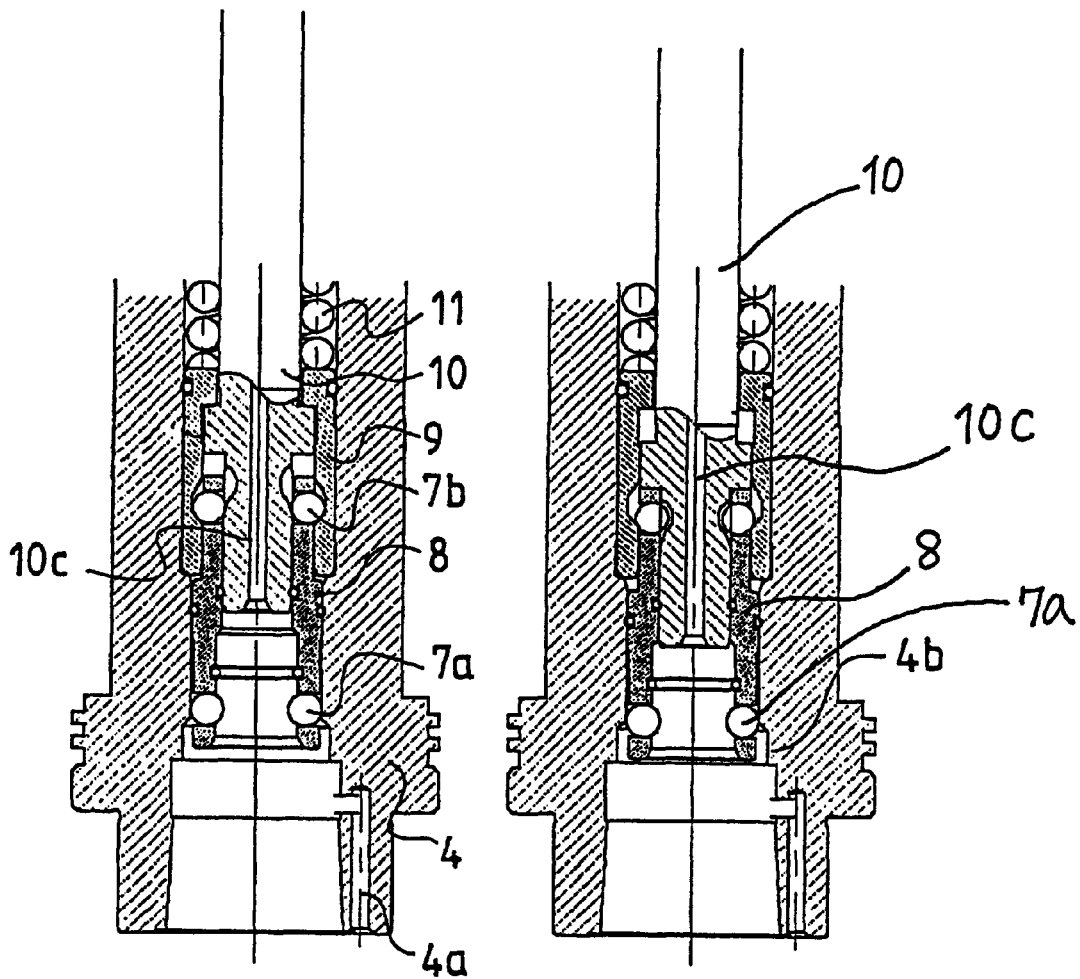
FIGS. 2A and 2B are views for illustrating the operation of the tool clamping mechanism of FIG. 1.

FIG. 2A shows an initial state in which the draw bar 10 is pressed against the upper end portion by means of the spring 11. When a roller 12 is advanced or lowered in the automatic tool changing operation, the draw bar 10 that is coupled to a guide ring 10b is pushed down. As the draw bar 10 descends, the second sleeve 8 is depressed to take the position shown in FIG. 2B.

In the state of FIG. 2B, compressed air starts to be delivered from the center through hole 10c of the draw bar 10. The draw bar 10 and the second sleeve 8 further descend, whereupon the balls 7a at the lower part of the second sleeve 8 are moved toward an opening position 4b at a step portion of the bore of the main spindle. In this state, the balls 7a allow the passage of the head of the pull stud 13.

Figures 3A, 3B, 3C:
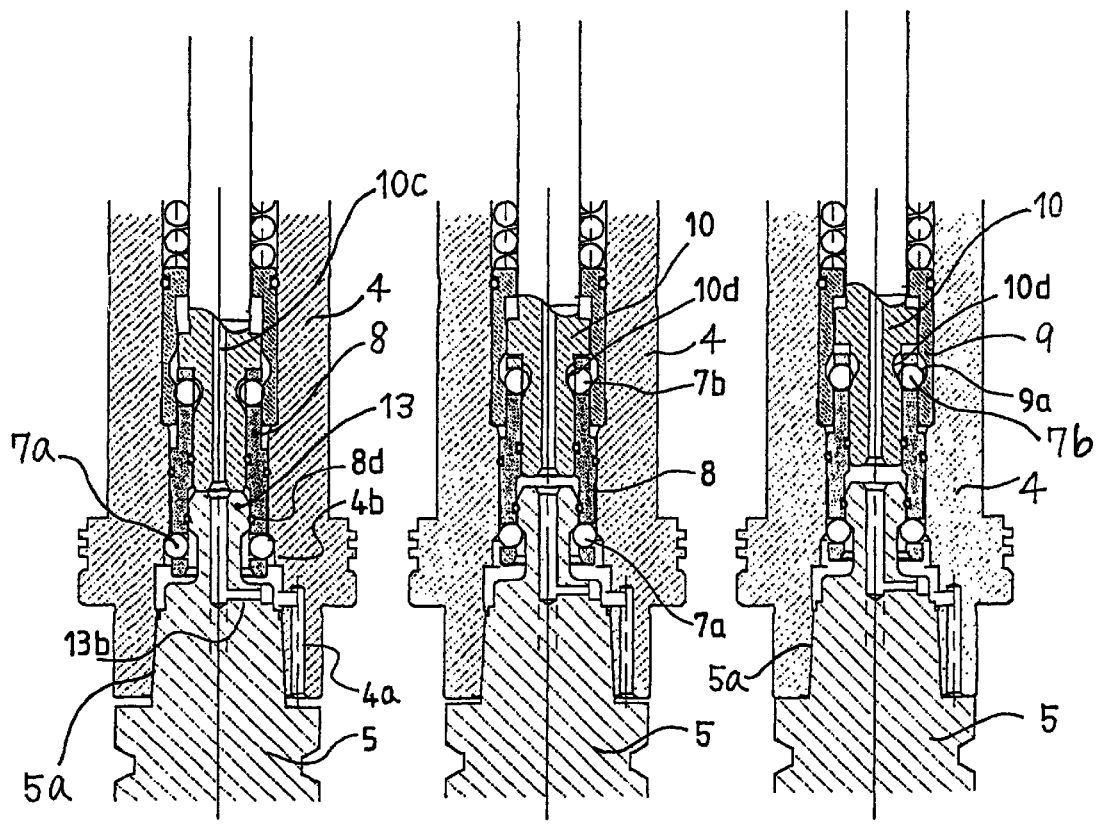
FIGS. 3A to 3C are views for illustrating additional processes of operation of the tool clamping mechanism that follow the processes shown in FIGS. 2A and 2B.

FIG. 3A shows the tool shank 5 that is inserted into the main spindle 4 by means of the automatic tool changer. When the pull stud 13 is inserted with its head allowed to pass by the balls 7a, as mentioned before, the balls 7a are spread out by the head of the stud 13. The outer peripheral surface of the pull stud 13 and the inner peripheral surface of the second sleeve 8 are sealed by means of an O-ring 8d that is attached to the sleeve 8, and the compressed air delivered from the through hole 10c of the draw bar 10 passes through a channel 13b in the pull stud 13 and flows into the space between a taper surface 5a of the tool shank 5 and a taper surface portion of the main spindle 4, thereby cleaning the two taper surfaces.

Further, the compressed air passes through, a hole 4a that connects an end face of the main spindle 4 and a space just under the junction of the pull stud 13 and the second sleeve 8, thereby cleaning both the respective end faces of the tool shank 5 and the spindle 4.

When the roller 12 ascends so that the draw bar 10 is caused to follow it and ascend by the repulsive force of the spring 11, the recesses 10d in the distal end portion of the draw bar 10 push up the balls 7b, so that the second sleeve 8 also ascends, as shown in FIG. 3B. When the second sleeve 8 ascends, the balls 7a at the lower end portion of the second sleeve 8 are caused to hold the head of the pull stud 13 by the contracted step portion of the hole in the main spindle 4. Then, the pull stud 13 is lifted, and the stud 13 and the tool shank 5 are pulled into the spindle 4.

FIG. 3C is a view showing a state such that clamping with the main spindle 4 is completed after the draw bar 10 is raised to lift the tool shank 5. The moment the clamping is completed, the supply of the compressed air is stopped, whereupon the tool change is finished. In this state, the balls 7b at the upper part of the draw bar 10 are held in engagement with the respective slopes of the recesses 10d of the draw bar 10 and the slope of the groove 9a in the first sleeve 9.

The taper surface of the main spindle 4 and the taper surface 5a of the tool shank 5 are brought intimately into contact with each other, and the end face of the spindle 4 and the cylindrical end face of the shank 5 are also brought intimately into contact with each other. By this two-side restriction, the tool shank 5 is clamped to the main spindle 4, and high retaining stiffness can be obtained.

Figure 5:
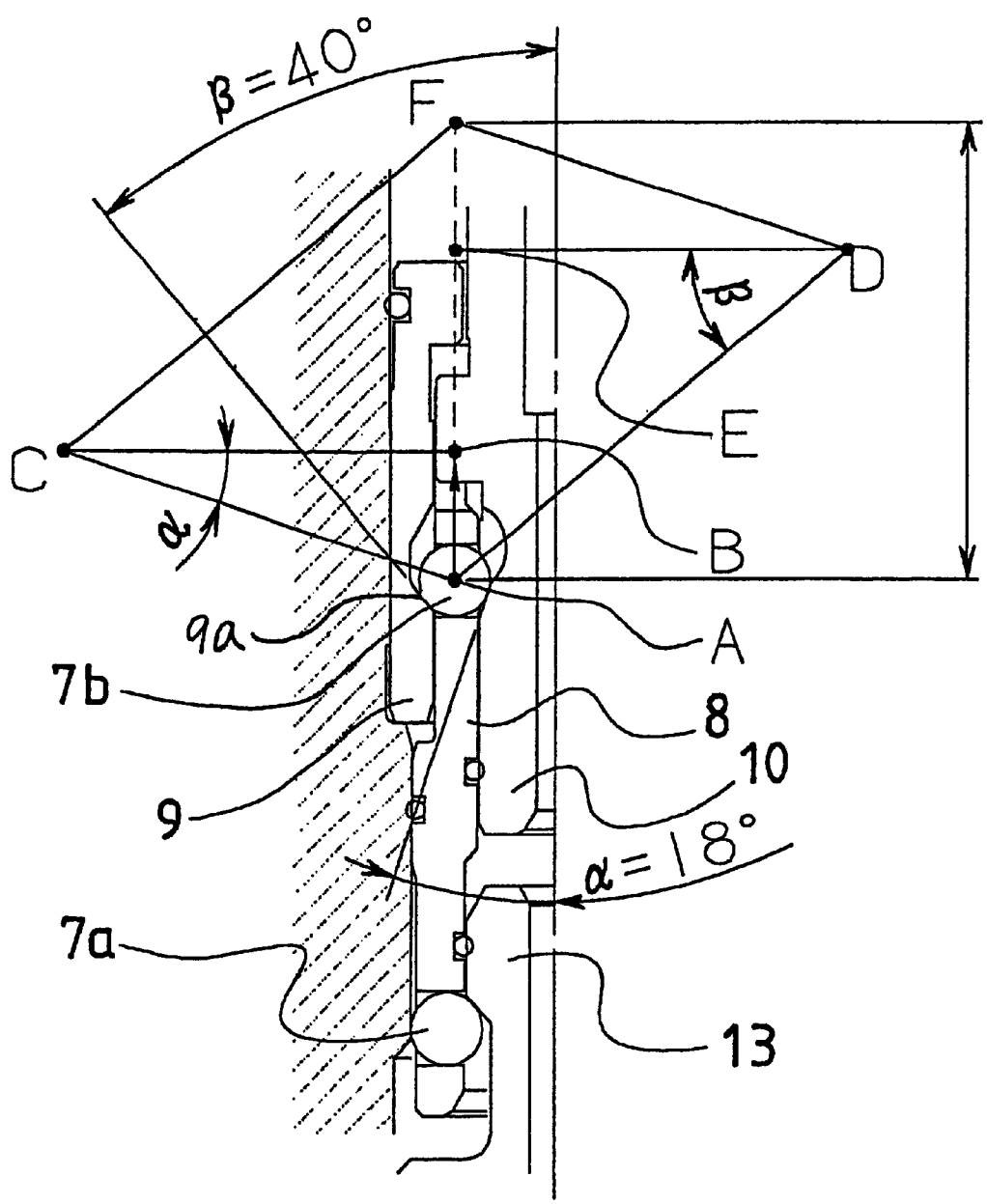
FIG. 5 is a diagram for illustrating force amplifying action in the tool clamping mechanism of FIG. 1.

FIG. 5 is a diagram for illustrating force amplifying action such that pulling forces of the draw bar 10 are transmitted to the second sleeve 8. The respective directions and magnitudes of the individual forces are represented by segments. In FIGS. 4A, 4C and 5, $\alpha$ is the angle of the slopes of the recesses 10d of the draw bar 10, and $\beta$ is the angle of the groove 9a of the first sleeve 9.

If the repulsive force of the spring 11 is given as a segment AB to the draw bar 10, as shown in FIG. 5, a force that each ball 7b receives from the slope of each recess 10d of the draw bar 10 is given as a segment AC in the direction perpendicular to the slope. A radial component of force of the segment AC is given by a segment BC. A force that each ball 7b receives from the slope of the groove 9a in the first sleeve 9 is given by a segment AD perpendicular to the slope. The segment AD represents a force of a magnitude such that its radial component of force ED is equal to the aforesaid radial component of force BC. A force that each ball 7b receives from both slopes is given by a segment AF, which represents the sum of the respective axial components of force, AB and AE, of the segments AC and AD. The segment AF represents a clamping force with which the pull stud 13 is pulled in. The magnitude of this force is given by $|AF|=|AB|\times(1+\sin\beta/(\tan\alpha\cdot\cos\beta))=|AB|\times(1+\tan\beta/\tan\alpha)$.

If $\alpha=18°$ and $\beta=40°$ are given, we obtain $|AF|=|AB|\times 3.58$, so that the repulsive force (segment AB) of the spring 11 is amplified by 3.58 times and transmitted to the pull stud 13. A necessary clamping force can be obtained by suitably selecting the angles $\alpha$ and $\beta$ of the slopes. A clamping force of 512 kgf can be obtained as a practical value for the design according to this embodiment with the repulsive force of the spring set at 143 kgf.

Figure 6C:
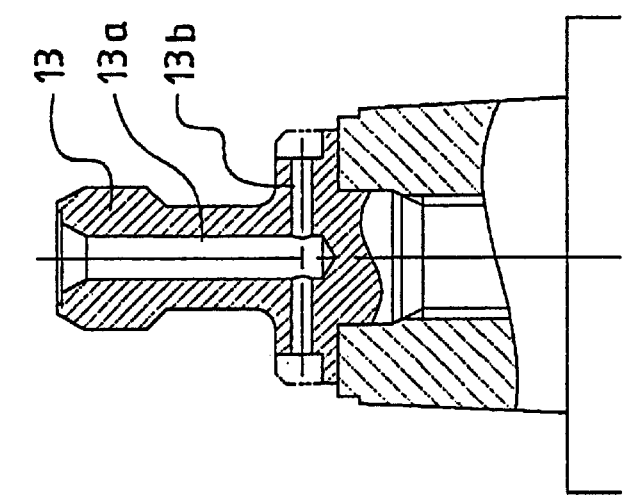
Figure 6B:
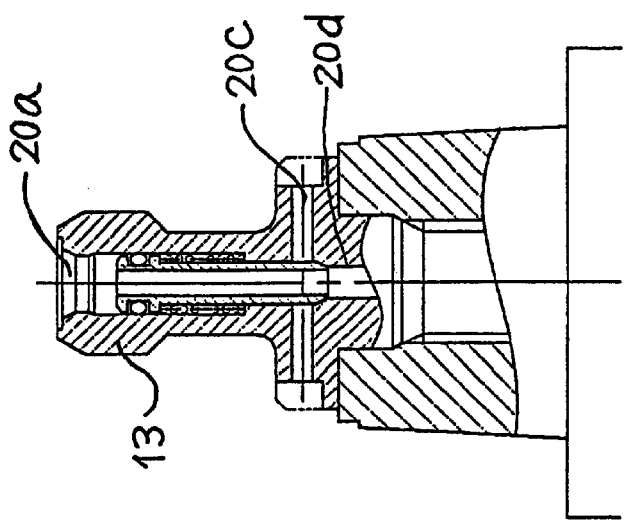
Figure 6A:
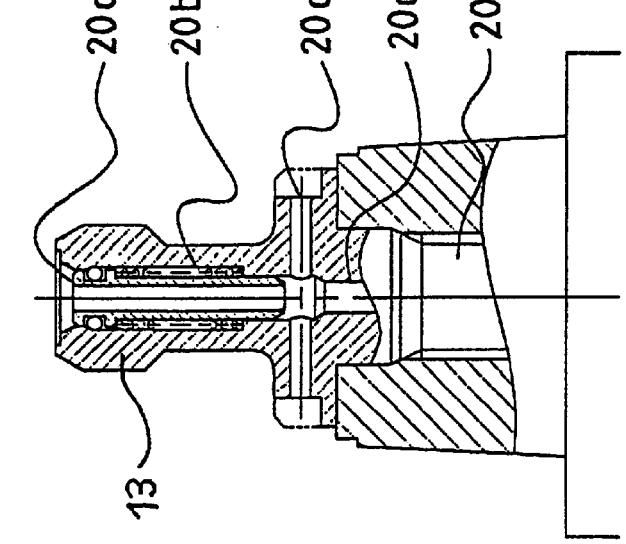
Figure 7:
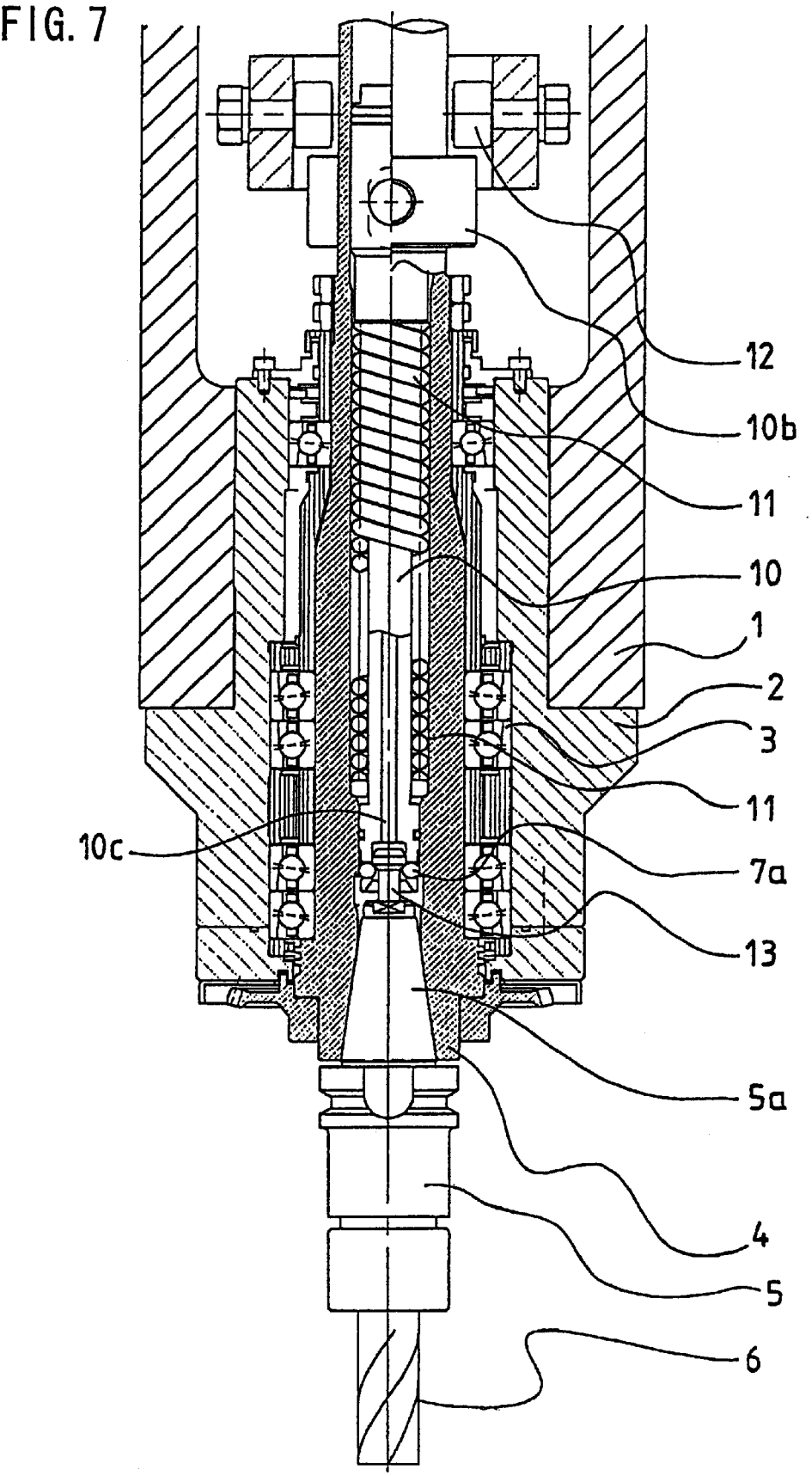
FIG. 7 is a view of a main spindle structure using a conventional chuck-type clamping mechanism.
Figure 8B:
FIGS. 8A to 8C are sectional views of a main spindle structure using a collet-type clamping mechanism, designed and studied in the process of development of the present invention.
Figure 8C:
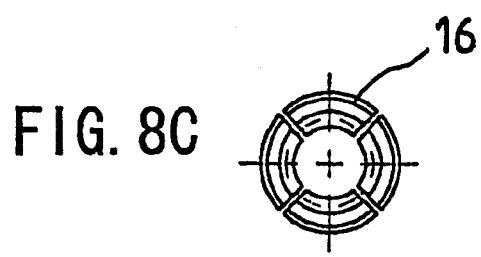
Figure 8A:
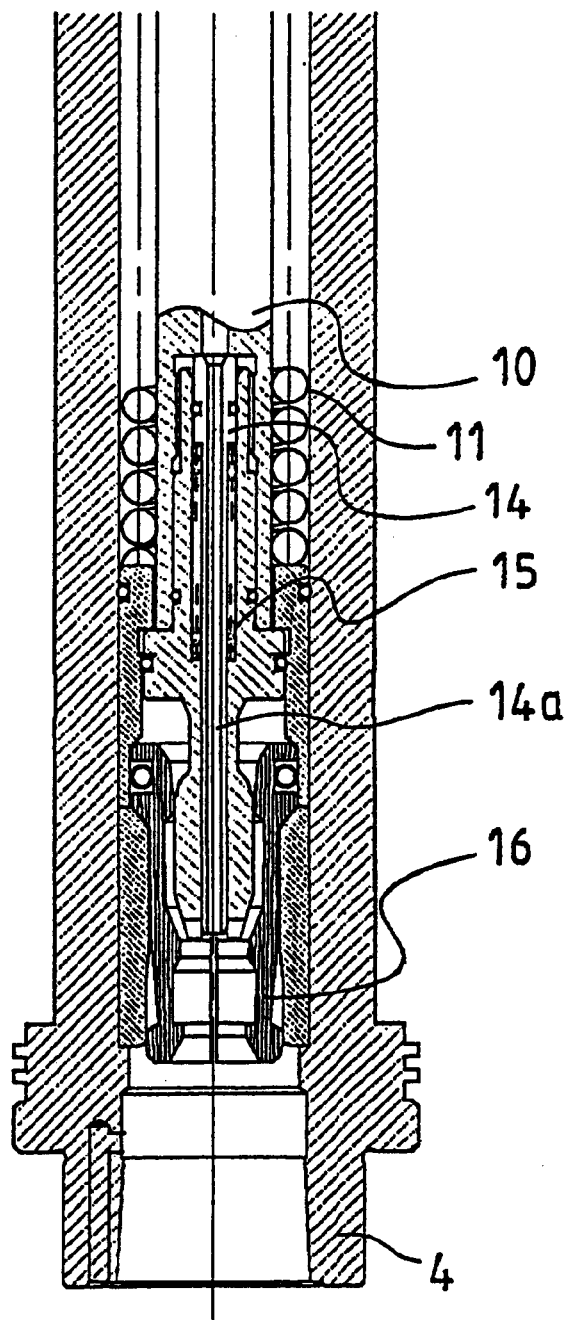
Figures 9A, 9B, 9C:
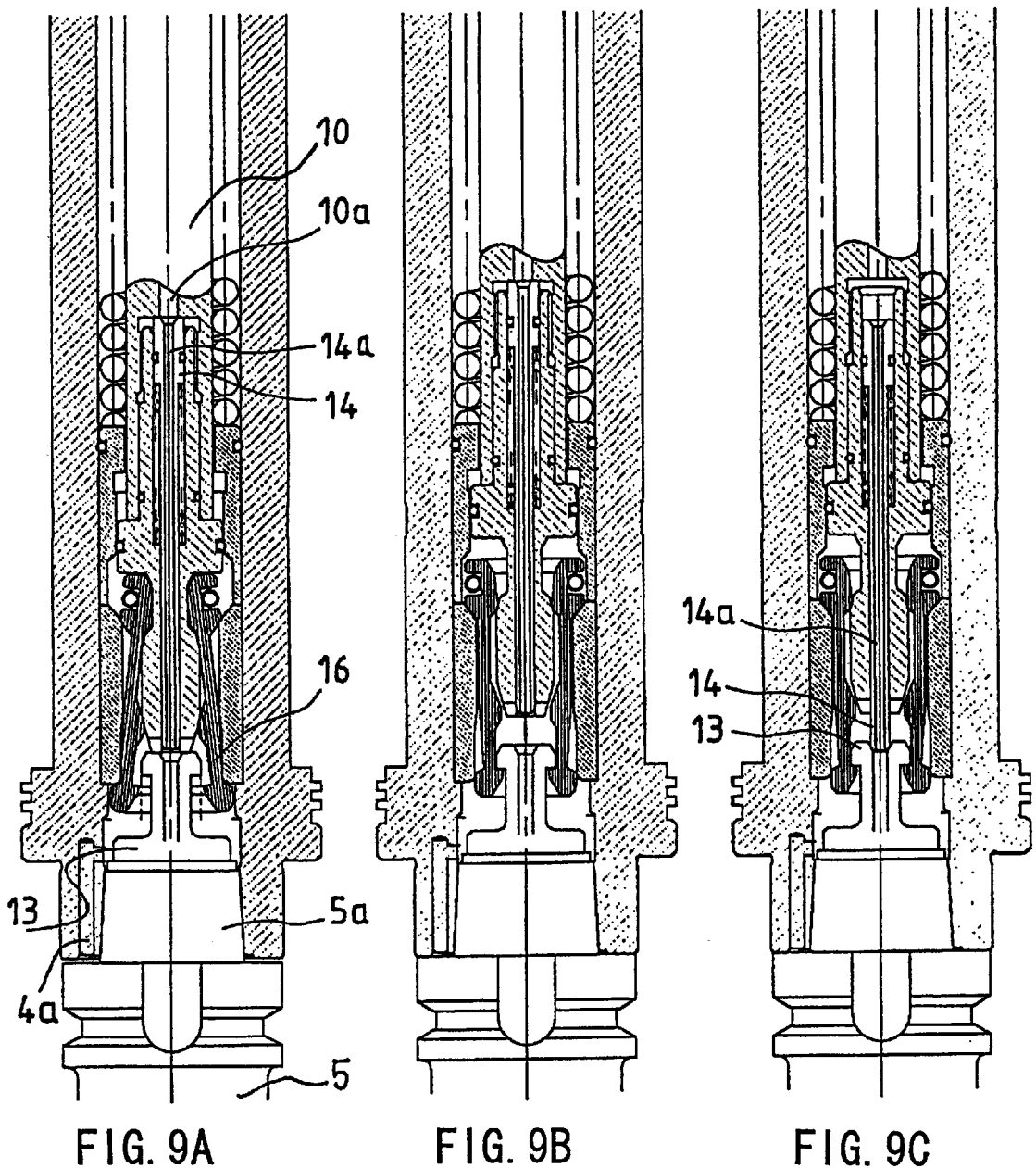
FIGS. 9A to 9C are views for illustrating the operation of the main spindle structure using the collet-type clamping mechanism of FIG. 8A.

FIGS. 6A to 6C are sectional views individually showing various configurations of the pull stud 13 used for the aforesaid clamping mechanism or the like, in which the respective taper surfaces and end faces of the main spindle 4 and the tool shank 5 can be cleaned. FIGS. 6A and 6B show a pull stud that is used for center-through cooling, while FIG. 6C shows a pull stud for cleaning only, that is, not for center-through cooling. The example shown in FIGS. 2A, 2B, 3A, 3B and 3C is the version shown in FIG. 6C.

A pull stud 20 for center-through cooling shown in FIGS. 6A and 6B is provided with a first guide hole 20d, which axially penetrates the stud 20 from the distal end of its head, and a second guide hole 20c, which radially extends connecting with the first guide hole 20d and opens sideways in the peripheral surface of the stud 20. A plunger 20a, a nail-shaped hollow component, is fitted in the first guide hole 20d for advance and retreat, and a spring 20b is disposed so as to urge the plunger 20a upward (or toward the distal end of the head of the pull stud 20).

When the plunger 20a is located at the upper end by means of the urging force of the spring 20b, the second guide hole 20c is allowed to communicate with the first guide hole 20d without being blocked by the plunger 20a, as shown in FIG. 6A. When the plunger 20a is located at the lower end, resisting the urging force of the spring 20b, on the other hand, the distal end of the plunger 20a and a step portion of the first guide hole 20d come intimately into contact with each other, as shown in FIG. 6B, thereby blocking the second guide hole 20c to prevent the communication of the second guide hole 20c with the first guide hole 20d.

The urging force of the spring 20b is set in the following manner. When compressed air for cleaning acts on the distal end of the plunger 20a (distal end side of the head of the pull stud 20), the plunger 20a is kept from moving by the urging force of the spring 20b. When a cutting fluid for center-through cooling acts on the distal end of the plunger 20a, its pressure allows the plunger 20a to move to the lower end, resisting the urging force of the spring 20b.

If the compressed air is delivered to the distal end of the head of the pull stud to clean the respective contact surfaces of the main spindle 4 and the tool shank 5, therefore, the plunger 20a can be kept at the upper end by means of the urging force of the spring 20b without moving, as shown in FIG. 6A. Accordingly, the compressed air passes through a through hole in the plunger 20a and the first and second guide holes 20d and 20c. After passing through the second guide hole 20c, the compressed air cleans the respective taper surfaces of the main spindle 4 and the tool shank 5, as described with reference to FIGS. 3A to 3C, and passes through the hole 4a in the main spindle 4 to clean also the respective end faces of the spindle 4 and the shank 5.

When the cutting fluid is delivered to the distal end of the head of the pull stud 13, on the other hand, its pressure causes the plunger 20a to move to the lower end, resisting the urging force of the spring 20b, as shown in FIG. 6B. Thereupon, the distal end of the plunger 20a and the step portion of the first guide hole 20d of the pull stud 13 come intimately into contact with each other, thereby blocking the second guide hole 20c. Accordingly, the cutting fluid is guided only to the first guide hole 20d, so that it flows through a hole in the center of a tool and jets out from the distal end of the tool.

Since the pull stud 20 is used less frequently, the frequency of use of the plunger 20a as fluid channel switching means located in the pull stud 20 is lower than in the case where the plunger is located in the draw bar, as shown in FIGS. 8A, 9A, 9B and 9C. Thus, the durability of the plunger is improved. If the plunger 20a is in trouble, moreover, it can be easily replaced with a new one, and besides, the pull stud can be changed entire, so that the maintenance management is easy.

FIG. 6C shows the pull stud 13 for cleaning without center-through cooling. A first guide hole 13a only communicates with a second guide hole 13b without penetrating the pull stud 13. The pull stud 13 of this type serves only to clean the respective taper surfaces and end faces of the main spindle 4 and the tool shank 5 to be brought intimately into contact with one another.

Although the pull stud is attached to the tool, according to the embodiment described above, it may alternatively be attached to the tool holder, and the tool clamping mechanism of the present invention may be also used for the replacement of the tool holder.

What is claimed is:

1. A tool clamping mechanism of the ball-chuck type, in which a draw bar is moved with respect to a main spindle in the axial direction thereof, whereby a ball chuck portion is moved to pull in or release a tool or tool holder, said draw bar having, in the outer peripheral portion thereof, a first recess in a shape such that a rolling element can submerge therein, said tool clamping mechanism comprising:

a first sleeve fixed to the inner peripheral surface of the main spindle between the draw bar and the ball chuck portion, the inner peripheral surface being formed having a second recess in a shape such that the rolling element can submerge therein;

a second sleeve located between the first sleeve and the draw bar for movement in the axial direction with respect to the first sleeve and the draw bar, the second sleeve being formed having a hole penetrating the second sleeve in the radial direction thereof; and the, rolling element stored in the hole of the second sleeve, the first recess in the inner peripheral portion of the draw bar and the second recess in the inner peripheral portion of the first sleeve constituting a pulling force amplifying mechanism for amplifying a force along the axial direction of the draw bar, thereby amplifying a pulling force to be transmitted to the ball chuck portion.

2. The tool clamping mechanism according to claim 1, wherein the inner periphery of said second sleeve and the outer periphery of a pull stud of a tool attached to a tool shank form a sealed structure when the pull stud of the tool held by means of the ball chuck portion is pulled into the main spindle.

3. The tool clamping mechanism according to claim 2, wherein said main spindle is provided with a hole penetrating the main spindle so as to extend close to the ball chuck portion from the distal end face of the main spindle.

4. The pull stud used for the tool clamping mechanism according to claim 3, which is formed having a guide hole extending from the distal end of the head thereof to penetrate the pull stud and opening in a peripheral surface thereof.

5. The pull stud used for the tool clamping mechanism according to claim 3, which is provided with a first guide hole extending from the distal end of the head thereof to penetrate the pull stud axially, a second guide hole connecting with the first guide hole and opening in a peripheral surface of the pull stud, and fluid channel switching means for opening and closing the second guide hole based on the pressure of a fluid.

6. The pull stud used for the tool clamping mechanism according to claim 3, which is formed having a first guide hole axially penetrating the pull stud and a second guide hole connecting with the first guide hole and opening in a peripheral surface of the pull stud, and which comprises a plunger, having an axially penetrating fluid guide hole and located in the first guide hole for axially movement between a position where the second guide hole is closed and a position where the second guide hole is open, and means for giving the plunger a return force to cause the plunger to move to the position where the second guide hole is open.

* * * * *